United States Patent [19]

Sandor et al.

[11] Patent Number: 5,066,697

[45] Date of Patent: Nov. 19, 1991

[54] POLYBENZIMIDAZOLE SOLUTIONS

[75] Inventors: Robert B. Sandor, Charlotte; Theodore S. Thornburg, Harrisburg, both of N.C.

[73] Assignee: Hoechst Celanese Corporation, Charlotte, N.C.

[21] Appl. No.: 537,469

[22] Filed: Jun. 8, 1990

[51] Int. Cl.$^5$ ................................................. C08K 5/04
[52] U.S. Cl. ..................................... 524/233; 524/234; 524/394; 524/104; 524/173; 524/612
[58] Field of Search ................ 524/233, 234, 394, 104

[56] References Cited

U.S. PATENT DOCUMENTS

| Re. 26,065 | 7/1966 | Marvel et al. | 260/47 |
| 2,895,948 | 7/1959 | Brinker et al. | 260/78.4 |
| 3,174,947 | 3/1965 | Marvel et al. | 260/47 |
| 3,502,606 | 3/1970 | Conciatori et al. | 260/32.6 |
| 4,321,182 | 3/1982 | Davitt et al. | 524/233 |

OTHER PUBLICATIONS

Vogel et al., "Polybenzimidazoles, New Thermally Stable Polymer" J. Polymer Sci., vol. 50, pp. 511–539, (1961).

Primary Examiner—Mary C. Lee
Assistant Examiner—Joseph K. McKane
Attorney, Agent, or Firm—Robert H. Hammer, III

[57] ABSTRACT

A solution polybenzimidazole which is resistant to phase separation contains: a polybenzimidazole; a solvent capable of dissolving the polybenzimidazole; and a minor amount of ammonium acetate.

9 Claims, 1 Drawing Sheet

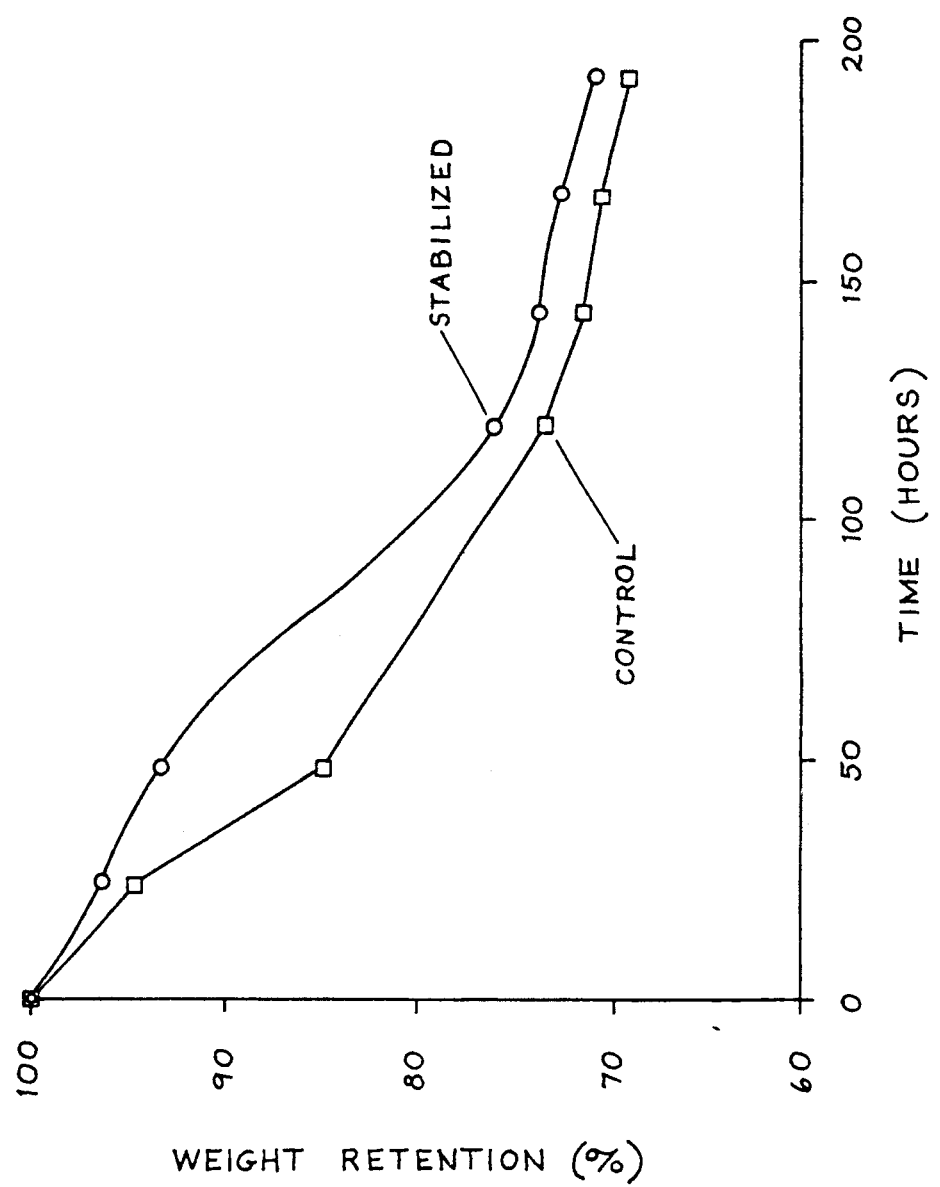

5,066,697

POLYBENZIMIDAZOLE SOLUTIONS

FIELD OF THE INVENTION

Polybenzimidazole solutions are stabilized, i.e., made resistant to phase separations, by the addition of a minor amount of ammonium acetate.

BACKGROUND OF THE INVENTION

Polybenzimidazoles are a known class of heterocyclic polymers. Their preparation and description are well documented in the literature. For example, see U.S. Pat. Nos. 2,895,948 and 3,174,947 and Vogel et al, *J. Polymer Science*, Vol. 50, pp. 511-539 (1961).

Polybenzimidazoles are characterized by a high degree of thermal stability. Moreover, they may be shaped to form fibers, films, and other articles of wide utility, such as where great resistance to degradation by heat, hydrolytic, and oxidizing media are necessary.

It has also been documented that solutions of polybenzimidazoles cannot be stored for long periods of time without "phasing out", i.e., a separation of the solution into two phases containing greater and lesser concentrations of polybenzimidazole. See U.S. Pat. Nos. 3,502,606 and 4,321,182.

U.S. Pat. No. 3,502,606 discloses that minor amounts of lithium chloride, zinc chloride, N-methyl morpholine, triethyl amine, or triethanol amine, when added to polybenzimidazole solutions, act as a stabilizer that prevents or retards "phasing out".

U.S. Pat. No. 4,321,182 discloses that minor amounts of an organo-lithium compound not only inhibits "phasing out" but also eliminates the possibility of stress corrosion cracking that arises from the use of halide based stabilizers, such as lithium chloride. In U.S. Pat. No. 4,321,182, the organo-lithium compounds are selected from the group consisting of $RCO_2Li$, $RSO_3Li$, $ROSO_3Li$, and mixtures of any two or all three of the foregoing wherein R is a hydrocarbon radical having 1 to 50 carbon atoms. Representative lithium salts of monocarboxylic acids are lithium formates, lithium acetate, lithium propionate, lithium butyrate, lithium isobutyrate, lithium valerate, lithium isovalerate, lithium caproate, lithium laurate, lithium cetylate, lithium stearate, etc. Representative lithium hydrocarbon sulfonates are lithium lauryl sulfonate, lithium cetyl sulfonate, etc. Representative lithium hydrocarbon sulfates are lithium lauryl sulfate, lithium cetyl sulfate, etc. The particularly preferred organo-lithium compound is lithium stearate.

The solutions of polybenzimidazole described in U.S. Pat. Nos. 3,502,606 and 4,321,182 are typically used to form shaped articles, e.g., fibers and films. Such solutions typically contained between 10-40 percent by weight polybenzimidazole. Polybenzimidazole solutions of higher concentration, e.g., up to 50 percent by weight, may be used in prepreg or laminate application, i.e., for the construction of composite materials.

DESCRIPTION OF THE FIGURE

FIG. 1 graphically illustrates the content of Table IV which sets forth the thermal-oxidative stability, at 700° F., of compression molded PBI laminates, ammonium acetate stabilized versus unstabilized.

SUMMARY OF THE INVENTION

A solution of polybenzimidazole which is resistant to phase separation comprises: a polybenzimidazole; a solvent capable of dissolving the polybenzimidazole; and a minor amount of ammonium acetate.

DETAIL DESCRIPTION OF THE INVENTION

The polybenzimidazole solutions discussed hereinafter comprise three principal components: the polybenzimidazole polymer; the solvent for the polybenzimidazole polymer; and a stabilizer.

Polybenzimidazole polymers, as used herein, shall refer to that class of heterocyclic polymers which demonstrate a high degree of thermal stability. Exemplary polybenzimidazole polymers are set forth in U.S. Pat. Nos. 3,502,606 and 4,321,182, both of which are incorporated herein by reference. The method by which polybenzimidazole polymers are produced is also well known, for example, see U.S. Pat. No. 2,895,948, U.S. Pat. No. Re 26,065, and Vogel et al, *Journal of Polymer Science*, Vol. 50, pp. 511-539 (1961), each reference is incorporated herein by reference.

The solvents for the polybenzimidazole polymer may include: N-N-dimethyl acetamide; N-N-dimethylformamide; dimethylsulfoxide; and N-methyl-2-pyrrolidine. N,N-dimethylacetamide, also referred to as dimethylacetamide, is preferred.

The stabilizer is ammonium acetate.

Solutions of polybenzimidazole polymer may range in polybenzimidazole content from about 10 to about 55 percent by weight of the solution. Preferably, the solution comprises about 45 percent by weight of the polybenzimidazole polymer. The solvent may range from about 45 to about 90 percent by weight of the solution. The stabilizer content of the solution may range up to 5 percent by weight of the solution. Preferably, the stabilizer comprises about 3 percent by weight of the solution.

EXAMPLE I 3324.6 grams of dimethylacetamide (DMAc) was charged into a two gallon Parr vessel. Then, 2746.0 grams of 0.22 I.V. (intrinsic viscosity) PBI polymer (i.e., poly[2,2'-(m-phenylene)-5,5'-bibenzimidazole]) was charged into the vessel. The contents of the vessel were agitated at 500 rpm throughout the solutioning cycle. The vessel was nitrogen purged (nitrogen at 50 psig) 5 times. The vessel's contents were then heated to 105° C. and vented. Thereafter, the vessel's contents were ramped to 125° C. At 125° C., the vessel was vented and heating continued to 145° C. At 145° C., the vessel was again vented and heating continued to a temperature of 235° C. The vessel's contents were held at 235° C. for one hour. At the end of the one hour period a vessel pressure of 80 psig was observed. The vessel's contents were then allowed to cool to 70° C.

A sample was withdrawn from the vessel (all samples were drawn at temperatures ranging from 60° to 70° C.) These were control samples representing 0 percent ammonium acetate. All samples were kept in sealed jars.

Then enough ammonium acetate was added to make the solution 1 percent by weight ammonium acetate. Samples were drawn and the process was repeated to generate 3 percent and 5 percent ammonium acetate samples.

Three samples of each concentration were stored at room temperature. One sample of each was stored at 60° C. and another at 80° C.

All samples were observed daily to evaluate flowability and to check for the presence of phase out. The results of the phase out checks were as follows:

TABLE I

| Storage Temperature | Sample (By Wt Ammonium Acetate) | Days Until Phase Out (Days) |
|---|---|---|
| Room temp | 0 Percent | 30 |
| | 1 Percent | 36 |
| | 3 Percent | 323 |
| | 5 Percent | Not homogeneous |
| 60° C. | 0 Percent | 2 |
| | 1 Percent | 2 |
| | 3 Percent | 12-14 |
| | 5 Percent | Not homogeneous |
| 80° C. | 0 Percent | 2 |
| | 1 Percent | 2-5 |
| | 3 Percent | 12 |
| | 5 Percent | Not homogeneous |

In Table I, the phrase "not homogeneous" means that a hard black crust was observed in the sample. This crust made the phase out check impossible because it was impossible to observe the flowability of the sample.

EXAMPLE II

The following experiments demonstrate that the physical properties and thermo-oxidative stability of laminates prepared using stabilized PBI, as disclosed herein, are equivalent to those using an unstabilized solution.

A PBI/DMAc solution, 45 percent by weight PBI and 3 percent by weight ammonium acetate, was used to prepare two laminates. The laminates were prepared as follows:

The panels were made using prepreg containing BASF G-30-500 8 Harness Sateen fabric. Those PBI prepregs were then employed to prepare laminated articles of manufacture by employing conventional molding procedures. A suitable method consists of laying up multiple prepregs on a Teflon/glass release cloth placed on a tool which can be a mandrel heated internally and equipped with vacuum ports for drawing a vacuum on the composite layup. After laying up the desired layers or laminas of prepreg, a layer of microporous polypropylene film can be applied. The film permits the escape of volatiles without permitting the PBI resin to bleed from the system.

After laying up the film, a Teflon/glass release ply can be added followed by three plies of a glass bleeder, perforated layer of aluminum foil, three additional plies of glass bleeder and two plies of an aluminum foil vacuum bag. Full vacuum is then applied and maintained throughout the curing cycle.

The formed composite can then be maintained at a temperature of 140° C. for a period of 3 to 4 hours, permitting residual PBI solvent to be removed. The temperature of the composite can then be raised to 475° C. at the rate of 5 degrees per minute. At a temperature of 370° C. pressure ranging from 200 psi to 1,400 psi can be applied. The pressure and temperature can be maintained for approximately 2 hours and the composite then cooled under pressure.

The produced laminates have excellent chemical resistance and have high thermal tolerance, retaining dimensional stability and properties at temperatures in the range of 1,300 to 1,800° F. The composite laminates have excellent strength retention and bonding characteristics to a variety of resins.

These laminates were tested for tensile properties (short beam shear and flex strength), percent resin, specific gravity, thermo-oxidative stability, and void content. The following test procedures were used:

| | |
|---|---|
| Short beam shear | ASTM D-2344 |
| Flex strength | ASTM D-790 |
| Percent resin | ASTM D-1652 (Epoxy test) |
| Specific Gravity | ASTM D-792 |
| Thermal-oxidative stability | ASTM D-4102 |

"Void content" is calculated using known quantities, i.e, weights and volumes, and employing Archimedes principle of buoyancy.

These laminates compared to control laminates (i.e., control laminates are made according to the procedures above, but the PBI/DMAc contains no ammonium acetate) as follows:

TABLE II

| General Laminate Properties | | | | | |
|---|---|---|---|---|---|
| Ammonium Acetate Panels | | | Control Panels | | |
| % Resin | % Void | Density (g/cc) | % Resin | % Void | Density (g/cc) |
| a) 32.5 | 4.8 | 1.52 | 31.5 | 6.3 | 1.51 |
| b) 28.0 | 7.0 | 1.53 | 33.7 | 4.7 | 1.52 |

TABLE III

| Tensile Properties | |
|---|---|
| Ammonium Acetate Panels | Control Panels |
| Short Beam Shear (SBS in ksi) | |
| a) 7.34 | a) 7.76 |
| b) 7.42 | b) 7.26 |
| Flex Strength (ksi) | |
| a) 121.4 | a) 123.3 |
| b) 117.9 | b) 124.1 |

In Table III, each numerical value represents the average of 10 samples from each of the boards.

TABLE IV

| Thermal-Oxidative Stability Weight Retention During Isothermal Exposure to 700° F. In Air | | | |
|---|---|---|---|
| Ammonium Acetate Panel | | Control Panel | |
| Hours | Weight % Remaining | Hours | Weight % Remaining |
| 24 | 96.28 | 24 | 94.60 |
| 48 | 93.19 | 48 | 84.85 |
| 120 | 76.00 | 120 | 73.34 |
| 144 | 73.78 | 144 | 71.29 |
| 168 | 72.34 | 168 | 70.43 |
| 192 | 70.70 | 192 | 68.99 |

Reference should also be made to FIG. 1 which graphically illustrates the information set forth in Table IV.

The present invention may be embodied in other specific forms without departing from the spirit or essential attributes thereof and, accordingly, reference should be made to the appended claims, rather than to the foregoing specification, as indicating the scope of the invention.

We claim:

1. A solution of polybenzimidazole, the solution being resistant to phase separations, comprising:
   a polybenzimidazole;

a solvent capable of dissolving said polybenzimidazole; and a minor amount of ammonium acetate.

2. The solution according to claim 1, wherein said solvent is selected from the group consisting of N,N-dimethylacetamide, N,N-dimethylformamide, dimethylsulfoxide, and N-methyl-2-pyrrolidine.

3. The solution according to claim 1, wherein said solvent is a dimethyl acetamide.

4. The solution according to claim 1, wherein said minor amount of ammonium acetate is up to about 5 percent by weight of the solution.

5. The solution according to claim 1, wherein said minor amount of ammonium acetate is about 3 percent by weight of the solution.

6. The solution according to claim 1, wherein said polybenzimidazole comprises about 10 to about 55 percent by weight of the solution.

7. The solution according to claim 1, wherein said polybenzimidazole comprises about 45 percent by weight of the solution.

8. The solution according to claim 1, wherein said solvent comprises about 45 to about 90 percent by weight of the solution.

9. The solution according to claim 1, wherein said solvent comprises about 55 percent by weight of the solution.

* * * * *